US011917943B2

(12) United States Patent
Boll

(10) Patent No.: US 11,917,943 B2
(45) Date of Patent: Mar. 5, 2024

(54) HARVESTING APPARATUS HAVING PIVOTING PICKUP SWATHER

(71) Applicant: CLAAS Saulgau GmbH, Bad Saulgau (DE)

(72) Inventor: Ulrich Boll, Bad Salgau (DE)

(73) Assignee: CLAAS Saulgau GmbH, Bad Saulgau (DE)

( * ) Notice: Subject to any disclaimer, the term of this patent is extended or adjusted under 35 U.S.C. 154(b) by 422 days.

(21) Appl. No.: 17/199,012

(22) Filed: Mar. 11, 2021

(65) Prior Publication Data

US 2021/0282325 A1  Sep. 16, 2021

(30) Foreign Application Priority Data

Mar. 12, 2020  (DE) .......................... 102020106803.4

(51) Int. Cl.
*A01D 57/20* (2006.01)
*A01D 43/077* (2006.01)

(52) U.S. Cl.
CPC ........... *A01D 57/20* (2013.01); *A01D 43/077* (2013.01)

(58) Field of Classification Search
CPC .... A01D 57/20; A01D 43/077; A01D 89/004; A01D 84/00
See application file for complete search history.

(56) References Cited

U.S. PATENT DOCUMENTS

| | | | | |
|---|---|---|---|---|
| 7,310,929 B2 * | 12/2007 | Dow | ...................... | A01B 73/02 |
| | | | | 56/192 |
| 9,538,709 B2 * | 1/2017 | Bassett | ................ | A01D 89/002 |
| 10,076,071 B2 * | 9/2018 | Schwer | .................. | A01D 84/00 |
| 2009/0241503 A1 * | 10/2009 | Babler | ................... | A01D 84/00 |
| | | | | 56/366 |
| 2010/0037584 A1 * | 2/2010 | Dow | .................... | A01D 80/005 |
| | | | | 56/376 |
| 2014/0150396 A1 | 6/2014 | Gantzer et al. | | |
| 2014/0196429 A1 * | 7/2014 | Gantzer | ................ | A01D 84/00 |
| | | | | 56/377 |
| 2014/0260168 A1 * | 9/2014 | Clark | .................. | A01D 89/002 |
| | | | | 56/192 |

(Continued)

FOREIGN PATENT DOCUMENTS

| | | |
|---|---|---|
| DE | 102014103630 A1 | 9/2015 |
| DE | 102016103475 A1 | 8/2017 |
| EP | 2789223 A1 | 10/2014 |

(Continued)

OTHER PUBLICATIONS

European Search Report dated Sep. 1, 2021; 7 pages with machine translation.

*Primary Examiner* — Arpad Fabian-Kovacs

(57) ABSTRACT

Harvesting apparatus (10), namely merger or pickup swather with pickup members (18) designed as pickups for picking up harvested crop, with at least one transverse conveyor device (19) designed as belt conveyor for conveying the picked-up harvested crop in a transverse conveying direction running transversely with respect to a harvesting direction or direction of travel, wherein each pickup member (18) designed as a pickup is mounted pivotably on a respective transverse conveyor device (19) designed as belt conveyor, namely centrally with respect to the respective pickup member (18) via a respective joint (22).

14 Claims, 4 Drawing Sheets

(56) References Cited

U.S. PATENT DOCUMENTS

2015/0327428 A1\* 11/2015 Landon ................ A01D 89/001
  56/228

FOREIGN PATENT DOCUMENTS

| EP | 3437456 A1 \* | 2/2019 | ........... A01D 89/002 |
| EP | 3763181 A1 \* | 1/2021 | ........... A01B 73/044 |
| FR | 2908588 A1 \* | 5/2008 | ........... A01D 41/144 |
| GB | 1578207 A | 11/1980 | |
| WO | WO-2013007939 A1 \* | 1/2013 | ............. A01D 84/00 |

\* cited by examiner

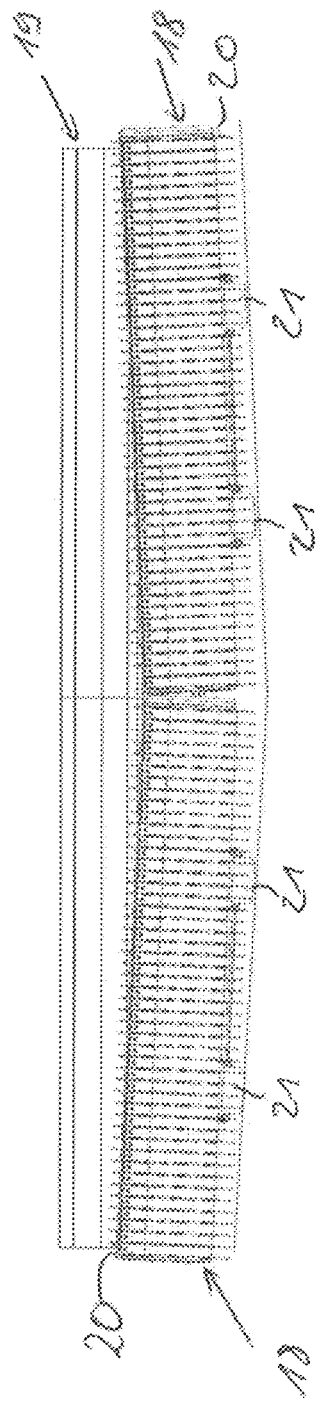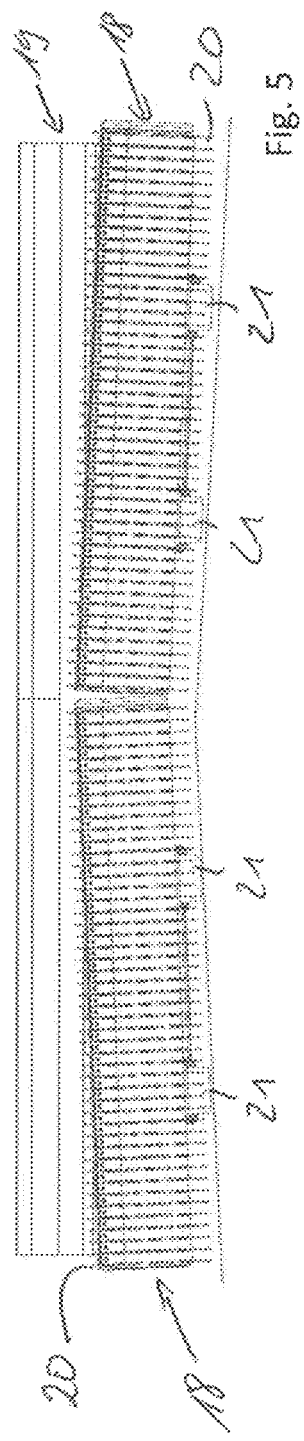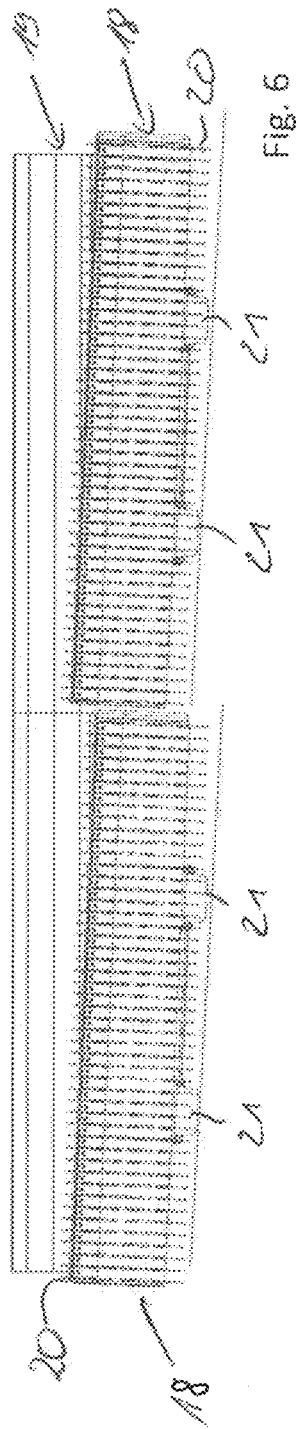

HARVESTING APPARATUS HAVING PIVOTING PICKUP SWATHER

The invention relates to a harvesting apparatus, namely a merger or a pickup swather, according to the preamble of claim 1.

EP 2 979 529 B1 discloses an agricultural harvesting apparatus designed as a merger. Mergers are also referred to as pickup swathers. According to this prior art, the harvesting apparatus designed as a merger has a supporting frame and has a chassis. Furthermore, the harvesting apparatus designed as a merger has pickup members designed as pickups for picking up harvested crop and transverse conveyor devices designed as belt conveyors for transversely conveying the picked-up harvested crop. The supporting frame has a longitudinal member and has crossmembers, wherein the pickup members and transverse conveyor devices are accommodated on the crossmembers. The pickup members and transverse conveyor devices are foldable in order to transfer the harvesting apparatus designed as a merger between a working position and a transport position. The agricultural harvesting apparatus designed as a merger can be coupled to a tractor via a drawbar engaging on the supporting frame.

Whenever a harvesting apparatus designed as a merger or pickup swather is used for cultivating an uneven underlying surface, under some circumstances not all of the harvested crop can be picked up from the underlying surface. This is because, in the case of mergers or pickup swathers known to date, adaptation to the ground is possible only to a limited extent, if at all. There is therefore a need for a harvesting apparatus which is designed as a merger or pickup swather and which has improved adaptation to the ground in order to be able to cultivate even an uneven underlying surface with greater quality.

Taking this as the starting point, the present invention is based on the object of providing a novel harvesting apparatus designed as a merger or pickup swather.

This object is achieved by a harvesting apparatus according to claim 1.

According to the invention, each pickup member designed as a pickup is mounted pivotably on a respective transverse conveyor device designed as belt conveyor, namely centrally with respect to the respective pickup member via a respective joint.

By this means, it is possible for each pickup member to be able to carry out adaptation to the ground individually. This is possible with simple structural means. The cultivation quality when cultivating an uneven underlying surface can be significantly improved. More harvested crop can be reliably picked up from the underlying surface.

According to an advantageous development, an axis of rotation of the respective joint runs in the harvesting direction or direction of travel. The respective joint preferably has a cylindrical or tubular support which engages centrally on the respective pickup member and extends into a recess in the respective transverse conveyor device, in which said support is mounted pivotably. This permits individual adaptation to the ground for each pickup member with simple structural means.

According to an advantageous development, an adjustment kinematics system interacts with each pickup member in order to change a relative position between the respective pickup member and feeler wheels. The respective adjustment kinematics system preferably has a linearly shiftable rod via which, in a first shifting direction of the rod, the respective pickup member can be lowered, in particular relative to the respective feeler wheels, and via which, in a second shifting direction of the rod, the respective pickup member can be raised, in particular relative to the respective feeler wheels. The individual adaptation of each pickup member to the ground can thereby be further improved.

Preferred developments of the invention emerge from the dependent claims and the description below. Exemplary embodiments of the invention, without being restricted thereto, will be explained in more detail with reference to the drawing, in which:

FIG. 4 shows a front view of the detail of FIGS. 1 and 2 in a first state of adaptation to the ground, in a working position;

FIG. 5 shows a front view of the detail of FIGS. 1 and 2 in a second state of adaptation to the ground, in a working position;

FIG. 6 shows a front view of the detail of FIGS. 1 and 2 in a third state of adaptation to the ground, in a working position;

The invention relates to a harvesting apparatus designed as a merger. Such a harvesting apparatus is also referred to as a pickup swather and substantially comprises at least one pickup member, which picks up harvested crop from the ground, and a transverse conveyor device, which interacts with the pickup member and conveys the harvested crop received from the pickup member transversely with respect to the harvesting direction or direction of travel.

Figure 1:
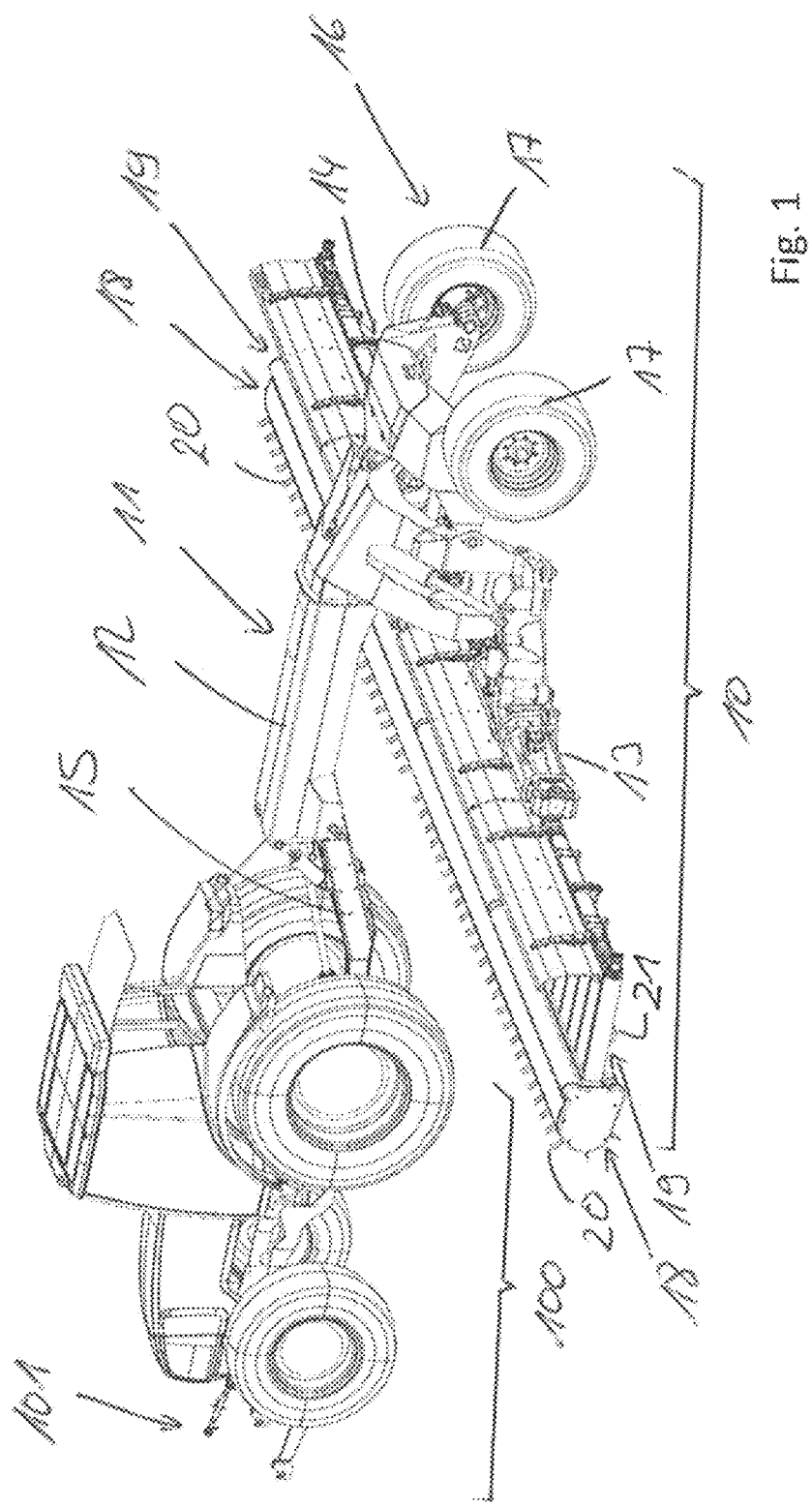
FIG. 1 shows a perspective view from above of a vehicle and trailer unit, which comprises a harvesting apparatus designed as a merger or pickup swather and a tractor, in a working position.

FIG. 1 shows a vehicle and trailer unit composed of a harvesting apparatus 10 designed as a merger or pickup swather and a tractor 100, in a working position.

The harvesting apparatus 10 shown in FIG. 1 has a supporting frame 11 with a longitudinal member 12 and crossmembers 13, 14. The harvesting apparatus 10 can be coupled to the tractor 100 via the longitudinal member 12, namely via a drawbar 15 engaging on the front end of the longitudinal member 12, in order to be pulled by the tractor 100 along an underlying surface to be cultivated. The longitudinal member 12 extends here in the direction of travel or harvesting direction. The crossmembers 13, 14 extend transversely or perpendicularly with respect thereto.

The harvesting apparatus 10 shown in FIG. 1 furthermore has a chassis 16 with wheels 17. The chassis 16 is also referred to as the main chassis. Both in a working position and in a transport position, and also in headland position, the harvesting apparatus 10 designed as merger is supported on an underlying surface to be cultivated or to be driven via the wheels 17 of the chassis 16.

The harvesting apparatus 10 furthermore has pickup members 18 and transverse conveyor devices 19. The pickup members 18 of the harvesting apparatus 10 are designed as what are referred to as pickups and serve for picking up harvested crop from the field/underlying surface. At least one pickup member 18 is arranged on a first side of the longitudinal member 12, and at least one pickup member 18 is arranged on a second side of the longitudinal member 12.

Preferably, as shown in FIG. 1, in each case two pickup members 18 are arranged on each side of the longitudinal member 12.

The pickup members 18 have pickup tines 20 which are driven about an axis extending transversely with respect to the harvesting direction or direction of travel in order to pick up the harvested crop from the underlying surface to be cultivated or to be driven over.

In the working position of the harvesting apparatus 10, each of the pickup members 18 is supported via feeler wheels 21 on the underlying surface to be cultivated. In the headland position and transport position of the harvesting apparatus 10, the feeler wheels 21 are lifted off from the underlying surface to be cultivated.

As already explained, the harvesting apparatus 10 has the transverse conveyor devices 19 in addition to the pickup members 18.

The transverse conveyor devices 19 of the harvesting apparatus 10 are designed as belt conveyors, wherein the transverse conveyor devices 19 can be used to transport the harvested crop picked up via the pickup members 18 from the underlying surface to be cultivated in a transverse conveyor direction 19 extending transversely or perpendicularly with respect to the harvesting direction or direction of travel.

At least one transverse conveyor device 19 is arranged on the first side of the longitudinal member 12, and at least one further transverse conveyor device 19 is arranged on the second side of the longitudinal member 12, wherein both of said transverse conveyor devices 19 are designed as belt conveyors.

Preferably, as shown in FIG. 1, in each case a single transverse conveyor device 19 is arranged on each side of the longitudinal member 12.

As can be gathered from the drawings, the transverse conveyor devices 19 are arranged behind the pickup members 18, as seen in the harvesting direction or direction of travel of the harvesting apparatus.

The invention is not restricted to the harvesting apparatus 10 which is shown in FIG. 1 and is designed as a merger or pickup swather. On the contrary, the invention can also be used in the case of a harvesting apparatus which is designed as a merger or pickup swather and which does not have a dedicated chassis 16, but rather, on the contrary, is coupled to a front coupling device 101 of the tractor 100. The chassis 16 with the wheels 17 and the supporting frame 11 with the longitudinal member 12 and the crossmembers 13, 14 are optional assemblies.

Figure 2:
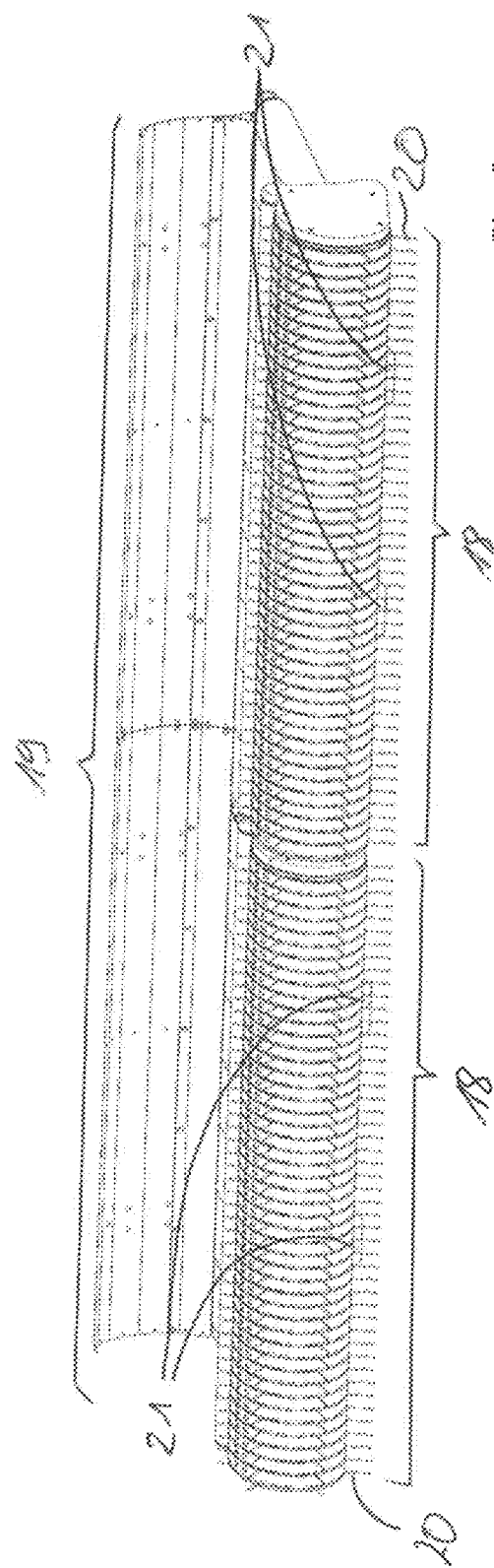
FIG. 2 shows a perspective view from the top at the front of a detail of the harvesting apparatus designed as a merger or pickup swather.
Figure 3:
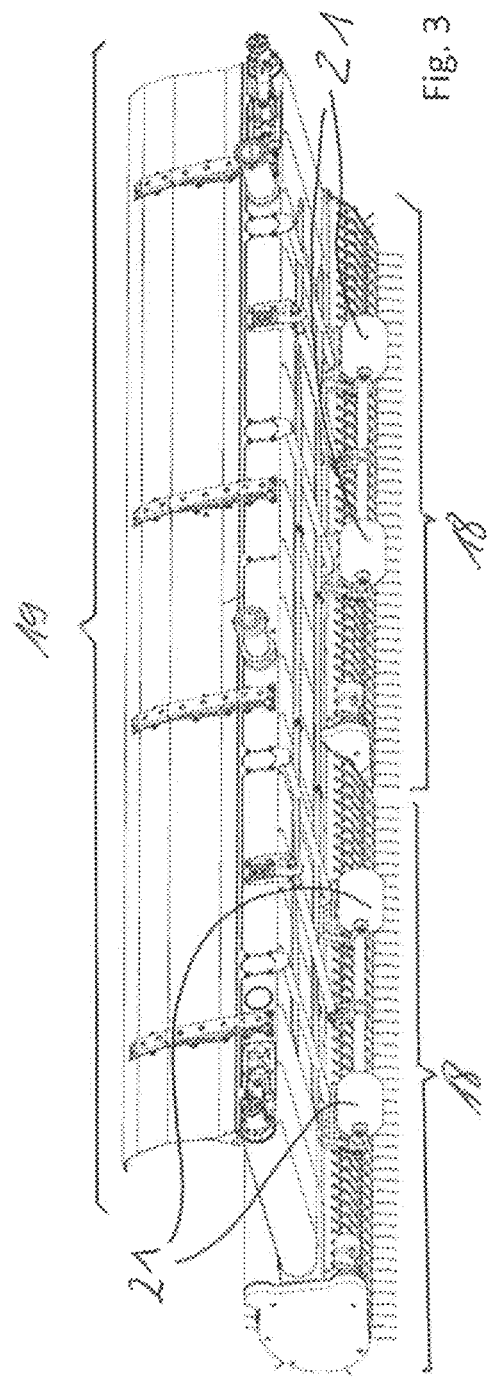
FIG. 3 shows a perspective view from the rear at the bottom of the detail from FIG. 2.

FIGS. 2 and 3 each show a perspective view of a detail of the harvesting apparatus 10 of FIG. 1, namely in the region of a transverse conveyor device 19 designed as a belt conveyor and in the region of two pickup members 18 which are designed as pickups and are arranged in front of the transverse conveyor device 19 in the harvesting direction or direction of travel or longitudinal direction.

In order to permit optimum adaptation to the ground for the harvesting apparatus 10 when an underlying surface to be cultivated is uneven, each pickup member 18 designed as a pickup is mounted on a respective transverse conveyor device 19, designed as a belt conveyor, so as to be pivotable individually, namely centrally with respect to the respective pickup member 18 via a respective joint 22. FIGS. 4, 5 and 6 thus show the detail of FIGS. 1 and 2 in different states for adaptation to the ground on an underlying surface which is to be cultivated and which is indicated by a dotted line in FIGS. 4, 5 and 6.

FIG. 4 thus shows the pickup members 18, which are designed as pickups, in a state which said pickup members take up, for example, if the underlying surface to be cultivated has a hollow.

FIG. 5 shows the pickup members 18 in a state which said pickup members take up, for example, if the underlying surface to be cultivated has a dome.

FIG. 6 shows the pickup members 18 in a state which said pickup members take up, for example, if the underlying surface to be cultivated has an inclination with a step and thus a stepped inclination.

Each of the pickup members 18 designed as pickups is, as already explained, mounted pivotably on the respective transverse conveyor device 19 designed as a belt conveyor. Each pickup member 18 can therefore be individually oriented with respect to the respective transverse conveyor device 19 for the purpose of adaptation to the ground on an underlying surface to be cultivated.

Figure 7:
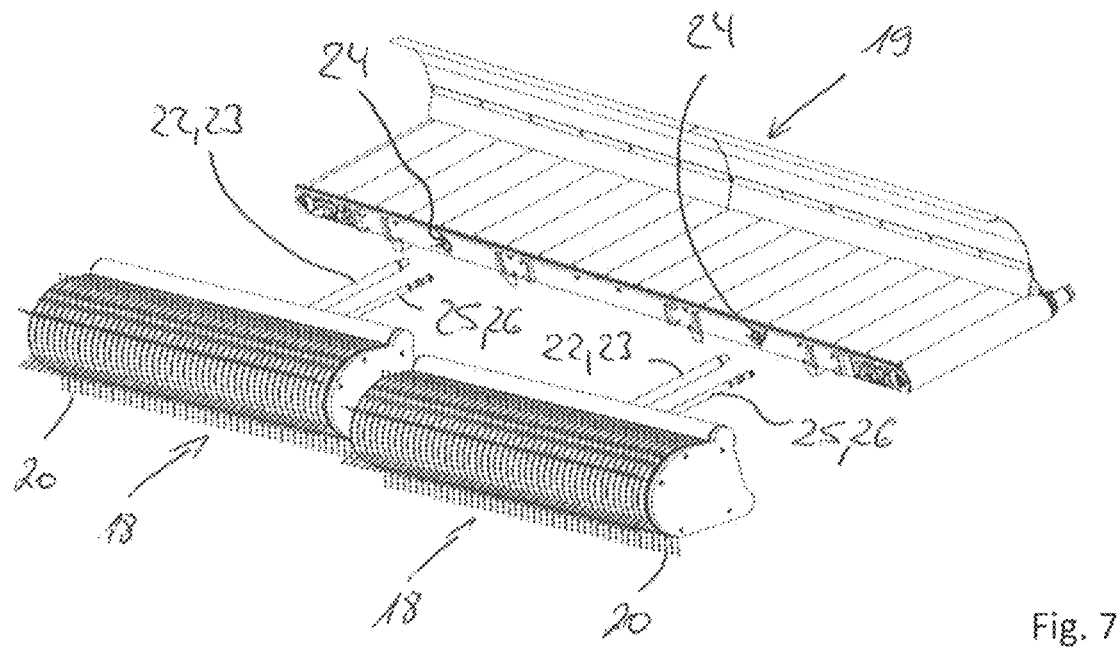
FIG. 7 shows a partial perspective exploded view from the top at the front of the detail of FIGS. 1 and 2.
Figure 8:
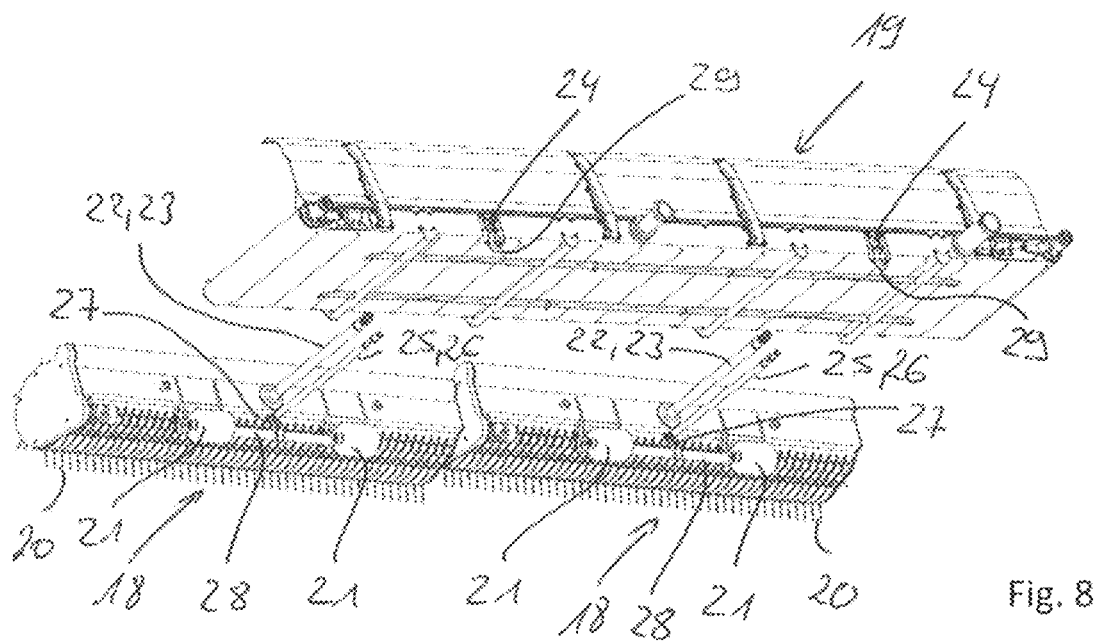
FIG. 8 shows a partially perspective exploded view from the bottom at the rear of the detail of FIGS. 1 and 2.

With respect to the respective pickup member 18, the respective pickup member 18 is mounted pivotably centrally on the respective transverse conveyor device 19, namely via in each case a joint 22. Said joint 22 is discussed below with reference to the exploded illustrations of FIGS. 7 and 8.

The respective joint 22 for the individual pivotable mounting of the respective pickup member 18 on the respective transverse conveyor device 19 comprises a cylindrical or tubular support 23 which engages centrally on the respective pickup member 18 with respect to the width of the respective pickup member 18. Said cylindrical or tubular support 23 extends into a recess 24 in the respective transverse conveyor device 19, in which the cylindrical or tubular support 23 is mounted pivotably, in particular via bearings positioned in the respective recess 24.

An axis of rotation or pivot axis of the respective joint 22 runs in the harvesting direction or direction of travel and thus, in FIG. 1, parallel to a longitudinal direction of the longitudinal member 12 of the supporting frame 11.

In order to further improve the adaptation of the respective pickup member 18 to the ground, a relative position between the respective feeler wheels 21 and the respective pickup member 18 can be adjusted via an adjustment kinematics system 25. The respective adjustment kinematics system 25 here has a linearly shiftable rod 26 which, like the cylindrical or tubular support 23, engages centrally on the respective pickup member 18 with respect to the width of the respective pickup member 18 and extends below the respective support 23 or runs below the respective support 23. A first end of said rod 26 engages on a lever 27 of the pickup member 18, which lever also engages on an axle 28 accommodating the feeler wheels 21. An opposite second end of the rod 26 is guided in a tab 29 which engages on a side of the respective transverse conveyor device 19 facing away from the pickup members 18.

By shifting of the respective rod 26 in a first linear shifting direction, the respective pickup member 18 can be lowered, in particular relative to the respective feeler wheels 21. This takes place whenever the rod 26 is pulled, as seen from the transverse conveyor device 19, i.e. whenever a tensile force is exerted on the rod 26, the tensile force being oriented in such a manner that the respective force vector points from the respective pickup member 18 in the direction of the respective transverse conveyor device 19. By shifting of the rod 26 in an opposite second shifting direction, the respective pickup member 18 can be raised relative to the respective feeler wheels 21, namely whenever a shear force is exerted on the respective rod 26, the force vector of which shear force points from the respective transverse conveyor device 19 in the direction of the respective pickup member 18.

The invention permits optimum adaptation to the ground of the harvesting apparatus designed as a merger or pickup swather to an underlying surface to be cultivated. Each pickup member 18 designed as a pickup can rotate individually relative to the respective transverse conveyor device 19 designed as a belt conveyor. By this means, even if the underlying surface to be cultivated is uneven, harvested crop can be readily picked up by the pickup members 18 of the harvesting device 10 and transferred to the respective transverse conveyor device 19.

LIST OF REFERENCE SIGNS

10 Harvesting apparatus
11 Supporting frame
12 Longitudinal member
13 Crossmember
14 Crossmember
15 Drawbar
16 Chassis
17 Wheel
18 Pickup member
19 Transverse conveyor device
20 Pickup tines
21 Feeler wheel
22 Joint
23 Support
24 Recess
25 Adjustment kinematics system
26 Rod
27 Lever
28 Axle
29 Tab
100 Tractor
101 Front coupling device

The invention claimed is:

1. A harvesting apparatus (10), namely merger or pickup swather,
with pickup members (18) designed as pickups for picking up harvested crop,
with at least one transverse conveyor device (19) designed as belt conveyor for conveying the picked-up harvested crop in a transverse conveying direction running transversely with respect to a harvesting direction or direction of travel,
characterized in that
each pickup member (18) designed as a pickup is mounted pivotably on and pivotally movable relative to a respective transverse conveyor device (19) designed as belt conveyor, namely centrally with respect to the respective pickup member (18) via a respective joint (22).

2. The harvesting apparatus according to claim 1, characterized in that an axis of rotation of the respective joint (22) runs in the harvesting direction or direction of travel.

3. The harvesting apparatus according to claim 1, characterized in that the respective joint (22) has a cylindrical or tubular support (23) which engages centrally on the respective pickup member (18) and extends into a recess (24) in the respective transverse conveyor device (19), in which said support is mounted pivotably.

4. The harvesting apparatus according to claim 1, characterized in that an adjustment kinematics system (25) interacts with each pickup member (18) in order to change a relative position between the respective pickup member (18) and feeler wheels (21).

5. The harvesting apparatus according to claim 4, characterized in that the respective adjustment kinematics system (25) has a linearly shiftable rod (26) via which, in a first shifting direction of the rod (26), the respective pickup member (18) can be lowered, and via which, in a second opposite shifting direction of the rod (26), the respective pickup member (18) can be raised.

6. The harvesting apparatus according to claim 5, characterized in that the respective linearly shiftable rod (26) engages centrally at a first end on the respective pickup member (18), wherein an opposite second end of the respective rod (26) is guided in a tab (29) of the respective transverse conveyor device (19).

7. The harvesting apparatus according to claim 6, characterized in that the respective linearly shiftable rod (26) engages at the first end on a lever (27) of the respective pickup member (18), said lever engaging on an axle (28) accommodating the feeler wheels (21) of the respective pickup member (18).

8. The harvesting apparatus according to claim 5, characterized in that the respective linearly shiftable rod (26) runs below the respective cylindrical or tubular support (23).

9. The harvesting apparatus according to claim 6, characterized in that the respective linearly shiftable rod (26) runs below the respective cylindrical or tubular support (23).

10. The harvesting apparatus according to claim 7, characterized in that the respective linearly shiftable rod (26) runs below the respective cylindrical or tubular support (23).

11. The harvesting apparatus according to claim 2, characterized in that the respective joint (22) has a cylindrical or tubular support (23) which engages centrally on the respective pickup member (18) and extends into a recess (24) in the respective transverse conveyor device (19), in which said support is mounted pivotably.

12. A harvesting apparatus (10), namely merger or pickup swather,
with pickup members (18) designed as pickups for picking up harvested crop,
with at least one transverse conveyor device (19) designed as belt conveyor for conveying the picked-up harvested crop in a transverse conveying direction running transversely with respect to a harvesting direction or direction of travel,
characterized in that
each pickup member (18) designed as a pickup is mounted pivotably on a respective transverse conveyor device (19) designed as belt conveyor, namely centrally with respect to the respective pickup member (18) via a respective joint (22); and
an adjustment kinematics system (25) interacts with each pickup member (18) in order to change a relative position between the respective pickup member (18) and feeler wheels (21) and the respective adjustment kinematics system (25) has a linearly shiftable rod (26) via which, in a first shifting direction of the rod (26), the respective pickup member (18) can be lowered, and via which, in a second opposite shifting direction of the rod (26), the respective pickup member (18) can be raised.

13. The harvesting apparatus according to claim 12 characterized in that an axis of rotation of the respective joint (22) runs in the harvesting direction or direction of travel.

14. The harvesting apparatus according to claim 12, characterized in that the respective joint (22) has a cylindrical or tubular support (23) which engages centrally on the respective pickup member (18) and extends into a recess (24) in the respective transverse conveyor device (19), in which said support is mounted pivotably.

* * * * *